United States Patent [19]

Gross

[11] Patent Number: 4,832,885
[45] Date of Patent: May 23, 1989

[54] METHOD AND APPARATUS FOR MEASURING AND CONTROLLING THERMOPLASTIC FOAM SHEET BLOW-UP

[75] Inventor: Jonathan Gross, Canandaigua, N.Y.

[73] Assignee: Mobil Oil Corporation, New York, N.Y.

[21] Appl. No.: 166,130

[22] Filed: Mar. 9, 1988

[51] Int. Cl.⁴ ............ B29C 67/22; B29C 51/46; B29C 51/42
[52] U.S. Cl. .................. 264/40.6; 264/51; 264/321; 425/141; 425/144; 425/817 C
[58] Field of Search ........... 264/406, 129, 321, 51; 425/141, 144, 817 C

[56] References Cited

U.S. PATENT DOCUMENTS

| | | | |
|---|---|---|---|
| 3,711,584 | 1/1973 | Sagane et al. | 264/54 |
| 3,801,244 | 4/1974 | Eisenberg | 425/112 X |
| 4,213,925 | 7/1980 | Kiyono et al. | 264/54 X |
| 4,244,897 | 1/1981 | Moon | 264/40.6 X |

*Primary Examiner*—Philip Anderson
*Attorney, Agent, or Firm*—Alexander J. McKillop; Charles J. Speciale

[57] ABSTRACT

A method and an apparatus for controlling foam sheet blow-up in a thermoformer oven. Control of the oven operation is achieved through monitoring the measured blow-up of a material which being heated in the thermoformer oven in a forming station or thermoformer, such as by a linear variable differential transformer, in order to adjust the thickness of the plastic material by regulating the temperature of the oven prior to the conveyance of the material into the molding or forming station.

9 Claims, 1 Drawing Sheet

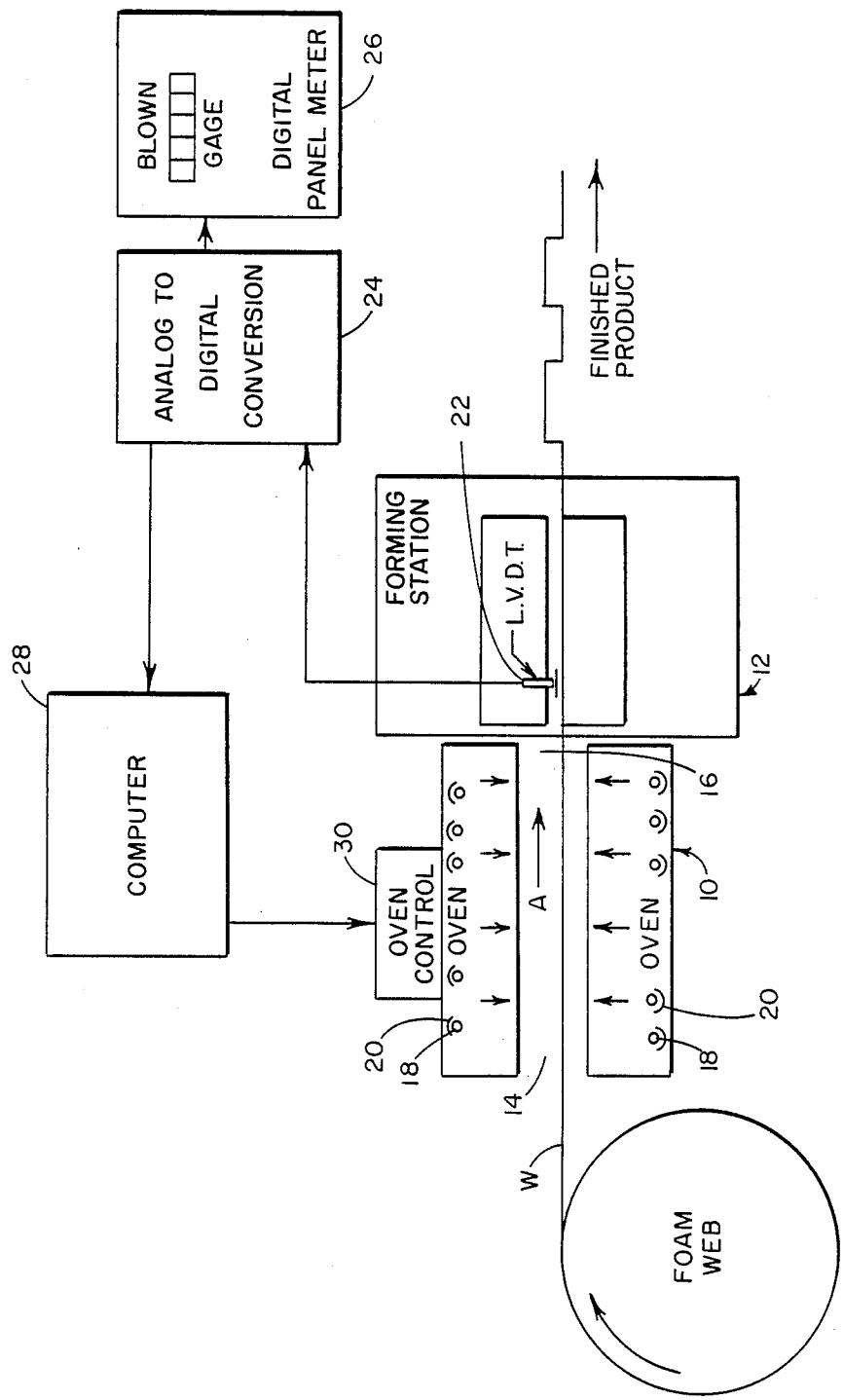

METHOD AND APPARATUS FOR MEASURING AND CONTROLLING THERMOPLASTIC FOAM SHEET BLOW-UP

BACKGROUND OF THE INVENTION

1. Field of the Invention

The present invention relates to a method and to an apparatus for measuring and controlling the blow-up of a thermoplastic foam sheet, and more particularly, pursuant to controlling the oven operation through monitoring the blow-up or blown gauge of a material which being heated in a thermoformer oven as the material is conducted into a thermoformer or molding station, in order to be able to regulate the thickness or blow-up of the plastic material prior to its conveyance into the molding or forming station.

In recent years, molded articles which are constituted of a thermoplastic foam material have gained wide commercial and consumer acceptance due to their economics in manufacture, aesthetic appeal and excellent physical properties. Among such articles are egg cartons, meat and food trays, cups and even larger items, such as boat hulls, refrigerator liners or the like, which are readily molded from a thermoformable plastic material. For instance, it is possible to mass-produce thermoformed articles in an extremely economical manner by heating a continuous sheet of a thermoplastic foam material, for example, foamable polystyrene or similar materials, to a predetermined temperature in a thermoformer oven so that the material is in a thermoplastic state, and from there to convey the heated sheet into a molding station or forming press, in which the thermoformed article configurations are molded into the sheet of the plastic foam material.

In essence, the heating to the molding temperature of the thermoplastic foam material in the thermoformer oven not only plasticizes the material but concurrently therewith expands the foam material so that the thickness of the material is increased up to approximately 1.5 to 2.0 times the original thickness during its conveyance through the oven. Although this phenomenon, known as "sheet blow-up" is three dimensional in nature, orientation stresses purposely built into the material during extrusion thereof, opposed by the clamping action of the sheet gripping and conveying mechanism in the thermoformer oven, and the continuity of the sheet in the machine direction, result in minimal changes in the sheet length and width during heating of the latter in the thermoformer oven. The increase in the sheet thickness during heating is desirable since it reduces the density of the foam material and allows for the subsequent filling of wider mold gaps at various portions of specific foam plastic articles.

The mold gap in the production tooling, in effect, the void in the mold which is occupied by the product, may vary at different locations throughout the total mold cross-section for various reasons relating to desired final product shape, strength, functional needs, or aesthetics. Thickness of the expanded foam prior to entry into the mold is important since it is desirable to fill all portions of the mold gap throughout the various cross-sections of the mold cavity, and this must be accomplished while counteracting the thinning of the heated material as various portions are stretched and formed into the desired contours of the finished article.

In order to be able to provide molded products in the molding station which evidence a high degree of definition in its conformance with the configurations of the mold, and which provide a consistency and appearance essential to their saleability and utility, it is necessary to heat the plastic material to a predetermined temperature in the thermoformer oven and to maintain the material at that temperature to thereby achieve the desired extent of sheet "blow-up" or expansion. Variations in the temperature over the surface of the heated sheet of plastic material as it is conducted from the thermoformer oven into the forming press will adversely affect the uniformity in the foam material thickness and, as a consequence, the consistency and quality of the thermoformed articles.

Generally, the thermoformable foam plastic sheet is heated by radiant energy heating during its conveyance through the thermoformer oven through the intermediary of a series of heater elements which are usually arranged above and below the path of travel of the material. Such heater elements, which direct the radiant heat against the surfaces of the sheet of plastic material, may be constituted of suitable parabolic heaters, bar heaters, infrared heaters, or ceramic blocks having heating coils therein, which normally extend transverse of the direction of travel of the plastic material sheet through the thermoformer oven, and with the heater elements being energized from an external power source. Additional heater elements may be provided along the edges of the oven to compensate for heat losses to gripping devices which engage the edges of the sheet for transporting the latter through the thermoformer oven. Upon leaving the thermoformer oven, the thus heated thermoplastic sheet is introduced into a thermoforming press and interposed between the surfaces of a pair of mold members which cooperate to force or mold the heated thermoplastic material into the shape of the thermoformed articles defined by the contours of the mold surfaces.

2. Discussion of the Prior Art

Currently, temperature conditions within the thermoformer oven, which are assumed to be indicative of the temperatures to which the plastic material has been heated and the blow-up thereof, are usually monitored by temperature sensors or thermocouples which measure the temperature of one of the heater elements in each heat zone within the thermoformer oven; of particular importance being the temperature of the material at the discharge end of the thermoformer oven. Any differentials in the monitored or sensed temperatures which deviate from desired temperature levels are read by an operator who will then manually regulate the energy input to various of the heater elements in order to either raise or lower the temperature in those zones of the oven so as to provide and maintain the optionally desired thermoplastic material temperatures and resultant blow-up.

Although monitoring or sensing the temperature conditions within the thermoformer oven and controlling the amount of radiant heat generated by the heater elements will, in theory, be an indication of the plastic material temperatures and, as a result, the theoretical "blow-up" or increase in thickness of the material, in actuality considerable deviations have been encountered in the thickness of the foamed material after heating in comparison with the presumed final ideal thickness of the material. These differences between the actual blow-up thickness and the intended or contemplated thickness of the foam plastic material may be occasioned, among other factors, by the cycling on and off of the heaters during normal operation, low or high spot temperatures at various locations within the oven, or varying conditions within the oven, all of which tend to adversely affect the uniformity or extent of heating of the plastic material and, as a result, the extent of blow-up and consistency of any thermoformed articles produced from the non-uniformly heated material, possibly resulting in voids, uneven articles and poor molded definition of the product.

While the actual thickness of the expanded foam material is of particular importance relative to the quality and shape of the resultant thermoformed article, previously no means had been available to routinely monitor this process factor prior to the molding cycle. Rather, it had been the practice of the equipment operator to occasionally observe formed product exiting from the production mold either visually or by gauge measurement, and react to heat related product deficiencies via manual adjustments to one or more of the various oven heat zones, without knowing the actual sheet thickness as the sheet enters the forming mold.

More recently, there has been developed an apparatus possessing sensing devices of either a contact or non-contact nature which will measure and display the thickness of the foam material just prior to entry into the product molding section of the thermoforming installation. Additional thickness sensing devices in the sheet heating environment can also be incorporated to monitor the change in thickness of the thermoplastic foam material as it moves along the length of the oven and the heat is absorbed and/or the use of the measured thickness as a control element for the operation of the thermoformer oven. Such an apparatus and a method for its utilization is disclosed in Holden U.S. Pat. No. 4,438,054, commonly assigned to the assignee of this application.

The Holden U.S. patent specifically provides for the sensors within the thermoformer oven which measure the "blow-up" or thickness of the heat expanded foam material at one or more locations within the oven. The sensors, which may be in the nature of structural components either contacting the surface of the foam material, or non-contacting sensors, such as infrared detectors, are connected to oven controllers which afford visual readouts of the measured thickness to an operator. The oven controllers are in turn, connected to the heater elements of the oven so that, when the thickness or "blow-up" which have been sensed deviate from a desired thickness for the foam plastic material which is being heated during its passage through the thermoformer oven, the operator may vary the energy or power input to the heater elements in that zone or zones of the oven so as to either increase or decrease the heat radiating against the sheet of plastic material. This will permit for the exercising of a control over the oven operation so as to achieve a more precise and uniformly distributed heating and heat expansion or blow-up of the plastic material prior to the discharge thereof to the thermoforming press.

Other types of film gauge or blow-up monitoring or sensing and controlling arrangements are disclosed in U.S. Pat. Nos. Sagane, et al. 3,711,584; Eisenberg 3,801,244; Kiyono, et al. 4,213,925; and Moon 4,244,897. However, none of these publications measure the thickness or gauge of the material as the latter enters the forming station from the thermoformer oven.

SUMMARY OF THE INVENTION

Although the foregoing prior art publication disclose apparatus and/or methods for the sensing of and controlling blow-up of a foam plastic material through the monitoring of the temperature in the thermoformer oven, none of the disclosures are directed to the measurements being implemented in the thermoformer or molding station subsequent to the foam material exiting from the thermoformer oven. This concept enables the extent of foam material blow-up to be more precisely regulated in dependence upon the measurement of the blown gauge of the foam material entering the forming or molding station.

Suitable sensors for measuring the blow-up of the foam material upon entering the molding station may be constituted of linear variable differential transformers. In this connection, the obtained data may be converted from analog to digital information, and the output displayed on a digital panel meter, through the intermediary of appropriate electronics circuitry.

Accordingly, it is a primary object of the present invention to provide a method for the measurement of the actual thickness of sheets of a blown-up thermoformable foam plastic material which is being conducted into a thermoformer or molding station.

Another object of the invention resides in the provision of a method for measuring the actual sheet thickness at least at one location within a thermoformer or molding station.

A further object of the invention provides a method of varying the energy supply to the heater elements of the thermoformer oven in response to the actual thickness or blow-up measured on the sheet in the molding or forming station so as to enable controlling operation of the oven to produce the desired blow-up thickness for the sheet.

In summation, the primary benefit of the novel foam material blow-up measuring method and thickness measuring devices pursuant to the invention, and for regulating the temperatures within the thermoformer oven, resides in the provision of a more consistently and uniformly heated thermoformable foam material resulting in an improved thermoformed product consistency. The concept of the invention in obtaining accurate control over the operation of the thermoformer oven is based upon:

(1) Utilization of foam material thickness sensing devices for reading of the actual sheet thickness at one or more locations within the thermoformer or molding station.

(2) Varying the energy supply or power inputs to respective of the heater elements based on the information obtained from the sensed sheet gauge in the molding or forming station to provide and maintain the sheet temperatures at desired levels in the oven and obtaining an optimum foam material blow-up prior to the thermoforming operation.

BRIEF DESCRIPTION OF THE DRAWINGS

Reference may now be had to the following detailed description of an exemplary embodiment of an apparatus for controlling thermoformer oven operation in response to actual foam material blow-up which is sensed in a sheet of thermoformable plastic film being transported through the thermoformer oven, taken in conjunction with the accompanying single drawing figure; in which there is illustrated a schematic representation of a thermoforming installation incorporating the thermoformer oven controlling apparatus pursuant to the invention.

DETAILED DESCRIPTION

Referring now in detail to the drawing, schematically illustrating a thermoforming installation pursuant to the invention, the installation is shown to include a thermoformer oven 10 which communicates at its outlet or discharge end with a forming station 12 comprising a mold or thermoforming press. In the illustrated embodiment, a sheet or web W of a thermoformable foam plastic material is supplied from a supply roll or other suitable supply source into the infeed end 14 of the thermoformer oven 10. Within the thermoformer oven 10 the sheet of plastic material W is transported be means of suitable edge gripping devices (not shown) in the direction of arrow A towards the discharge end 16 of the oven which, in general, is contiguous to or closely adjoins the inlet end of the forming station 12.

The interior of the thermoformer oven 10 is typically radiantly heated through a series of heater elements 18 normally extending transverse to the direction of travel of the plastic material sheet W both above and below the plane of travel of the web. As illustrated, in this instance the heater element may consist of a plurality of heating rods 18 extending from side to side of the thermoformer oven and having an arcuate reflector 20 positioned behind each of the heater elements in order to radiate the generated heat towards the surfaces of the plastic material sheet W so as to heat the latter. Additional heater rods or elements may be provided along the side edges of the oven along the direction of the travel of the sheet W therethrough in order to compensate for heating losses caused by the edge gripping devices. The utilization of the illustrated heater rod elements is exemplary, other suitable heating devices, such as heater plates, infrared heating devices, ceramic plates with inserted heating coils and the like also being applicable to provide the necessary heating of the sheet.

The temperature of the heater elements within the thermoformer oven 10 is maintained at a predetermined level through suitable control over the energy supply to the heater elements so as to heat the plastic foam material sheet W to a predetermined consistent temperature level at the discharge end 16 prior to the discharge or conveyance of the sheet from the thermoformer oven into the forming station 12.

Positioned at least at one location within the forming station 12, preferably proximate the inlet end thereof, is at least one sensor or measuring device 22, such as a linear variable differential transformer (L.V.D.T.) or the like, for measuring the blow-up or gauge of the foam sheet W entering the forming station 12 from the thermoformer oven 10. The measuring device 22 is connected to an analog-to-digital conversion unit 24, which in turn is connected to a digital panel meter 26 affording a visual readout of the gauge of the blown-up foam material sheet or web W entering the forming station 12 from the thermoformer oven 10.

Predicated on the values in the gauge of the foam material sheet W received in the forming station 12 and transmitted by the sensor 22 to the unit 24, if necessary, a signal may be delivered to a computer or microprocessor 28 to regulate an oven controller 30 for varying the energy supply to the heating elements 18 and to thereby change the temperature in the thermoformer oven 10 so as to control the blow-up of the film web W.

The foregoing apparatus and method affords a more precise measurement over the gauge of the material in the forming station 12, and enhances the uniformity and quality of the finished molded product emanating therefrom.

While there has been shown and described what is considered to be a preferred embodiment of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

I claim:

1. A method of measuring and controlling foam plastic sheet blow-up by regulating the operation of a thermoformer oven responsive to measuring of the thickness of a continuous sheet of a thermoformable foam plastic material which is conveyed through said thermoformer oven towards a thermoforming installation; comprising:
    (a) sensing the sheet thickness of the thermoformable material by positioning at least one sensor at a location within said thermoforming installation, said sensor measuring the extent of blow-up of said material at said location within said thermoforming installation prior to the discharge of the material therefrom;
    (b) and regulating the temperatures within said thermoformer oven in response to the sheet thickness being sensed within said thermoforming installation for maintaining the temperatures of said web of thermoformable material at predetermined temperature levels so as to thereby obtain a requisite blow-up of the material.

2. A method as claimed in claim 1, comprising determining the blow-up of said material through a linear variable differential transformer measuring device during conveyance of the sheet through said thrmoforming installation.

3. A method as claimed in claim 1, including a plurality of heater elements within said oven defining a plurality of heating zones, comprising varying the power inputs of the heater elements responsive to the sensed blow-up of said foam material in said thermoforming installation to maintain the material temperatures within predetermined temperature ranges within the respective heating zones in said oven.

4. A method as claimed in claim 3, comprising automatically varying the power inputs to said heater elements responsive to the measured blow-up of said material.

5. An apparatus for measuring and controlling foam plastic material blow-up to regulate the operation of a thermoformer oven responsive to measurements of the thickness of a sheet of thermoformable plastic material which is conveyed through said thermoformer oven towards a thermoforming installation; comprising:
    (a) material thickness sensing means arranged within said thermoforming installation at least at one location for the blow-up of said sheet within said thermoforming installation prior to the discharge of the material therefrom;
    (b) and means for regulating the temperatures within said thermoformer oven based on the measured sheet blow-up sensed within said thermoforming installation for maintaining the temperature of said sheet at predetermined temperature levels and to control the extent of material blow-up.

6. An apparatus is claimed in claim 5, said sensing means comprising a linear variable differential transformer for measuring said sheet thickness.

7. An apparatus as claimed in claim 6, said temperature regulating means comprising an oven controller, said thickness sensing means being connected to said controller to provide visual display of the actual sheet thickness, and said controller including means for regulating the oven temperature to control sheet blow-up.

8. An apparatus as claimed in claim 7, comprising a plurality of heater elements for heating said thermoformer oven, said oven temperature regulating means being adapted to vary the energy supply to said heater elements.

9. An apparatus as claimed in claim 5, comprising a plurality of said thickness sensing means being positioned at various locations in said thermoforming installation for measuring the blow-up over the entire surface of said sheet during conveyance through said installation.

* * * * *